US008688372B2

(12) United States Patent
Bhogal et al.

(10) Patent No.: US 8,688,372 B2
(45) Date of Patent: Apr. 1, 2014

(54) CONVEYANCE MODE AWARE NAVIGATION DEVICE

(75) Inventors: Kulvir S. Bhogal, Fort Worth, TX (US); Robert R. Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/442,632

(22) Filed: Apr. 9, 2012

(65) Prior Publication Data

US 2012/0221240 A1    Aug. 30, 2012

Related U.S. Application Data

(62) Division of application No. 11/855,483, filed on Sep. 14, 2007.

(51) Int. Cl.
*G01C 21/00* (2006.01)
*G08G 1/123* (2006.01)

(52) U.S. Cl.
USPC ........................................ 701/416; 340/995.2

(58) Field of Classification Search
USPC ......... 701/408, 410, 412, 428, 468, 416, 429, 701/438, 446; 340/988–996; 342/176, 374
See application file for complete search history.

(56) References Cited

U.S. PATENT DOCUMENTS

| | | | |
|---|---|---|---|
| 5,627,547 A | 5/1997 | Ramaswamy et al. | |
| 5,887,269 A | 3/1999 | Brunts et al. | |
| 5,911,773 A | 6/1999 | Mutsuga et al. | |
| 5,964,821 A | 10/1999 | Brunts et al. | |
| 6,304,821 B1 | 10/2001 | Shimamoto | |
| 7,092,724 B2 | 8/2006 | Fellenstein et al. | |
| 2003/0046304 A1 | 3/2003 | Peskin et al. | |
| 2005/0102098 A1 | 5/2005 | Montealegre et al. | |
| 2005/0165543 A1* | 7/2005 | Yokota | 701/204 |
| 2005/0251324 A1* | 11/2005 | Wiener et al. | 701/200 |
| 2007/0005235 A1* | 1/2007 | Suzuki et al. | 701/200 |
| 2008/0059061 A1* | 3/2008 | Lee | 701/209 |
| 2009/0076725 A1 | 3/2009 | Bhogal et al. | |

FOREIGN PATENT DOCUMENTS

JP    2007163413 A    6/2007

OTHER PUBLICATIONS

Office Action issued on Jul. 10, 2012 for U.S. Appl. No. 11/855,483, 16 pages.
Office Action dated Jun. 25, 2010, regarding U.S. Appl. No. 11/855,483, 10 pages.
Response to Office Action dated Sep. 24, 2010, regarding U.S. Appl. No. 11/855,483, 9 pages.
Final Office Action dated Dec. 8, 2010, regarding U.S. Appl. No. 11/855,483, 14 pages.

(Continued)

*Primary Examiner* — Muhammad Shafi
(74) *Attorney, Agent, or Firm* — Yee & Associates, P.C.; David A. Mims, Jr.

(57) ABSTRACT

A computer determines an optimal route to a destination. The computer identifies the present position of a navigation device with a user selecting a destination. The computer acquires current information comprising road, business hour, traffic congestion patterns, a plurality of conveyance modes, and time buffer information relative to the present position and the selected destination to store in the memory. A route identification unit identifies, from the acquired current information, an optimal route from the current position to the selected destination. The computer stores the acquired information in the memory of the navigation device and identifies an optimal route from the current position to the selected destination.

14 Claims, 3 Drawing Sheets

(56) References Cited

OTHER PUBLICATIONS

Amendment Pursuant to Request for Continued Examination dated Mar. 8, 2011, regarding U.S. Appl. No. 11/855,483, 10 pages.

Office Action, dated Aug. 21, 2013, regarding U.S. Appl. No. 11/855,483, 20 pages.
Final Office Action, dated Jan. 3, 2013, regarding U.S. Appl. No. 11/855,483, 23 pages.

* cited by examiner

CONVEYANCE MODE AWARE NAVIGATION DEVICE

CROSS REFERENCE TO RELATED APPLICATION

This application is a divisional of application Ser. No. 11/855,483 filed Sep. 14, 2007, status Pending.

BACKGROUND OF THE INVENTION

1. Field of the Invention

The present invention relates generally to data processing and providing information to a user based upon a user's present and desired positions as determined by a navigation device. The present invention more particularly relates to a computer implemented method, apparatus and computer usable program product for determining an optimal route for a user of a navigation device.

2. Description of the Related Art

Common usage of navigational devices has allowed travelers a greater degree of freedom and range than before. Many navigational devices have become available to aid the traveler in route selection between a starting place and a potential or a chosen destination. Most of these navigational devices typically calculate a shortest route based on time taken to reach the destination.

Other navigational device calculations consider the business hours of destination and warn the user if the estimated time of arrival (ETA) will be outside of the hours specified by the destination in order to meet the open time of destination. Still other navigational devices may add a selectable delay time to wait for an obstacle en route to be cleared, such as when waiting for a train to pass, to be factored into the arrival time calculation.

Still other navigational devices have the capability to request and receive current traffic conditions for the route in question and to factor the traffic delay into the routing estimation. In a similar manner, other route predictions may include use of factors such as road repair and the use of detours to be used in the calculation of routes.

Typically, current devices and calculations appear to be most suited for the road traveler and focused on the traveling of the highways and streets.

SUMMARY OF THE INVENTION

Illustrative embodiments provide a capability for determining an optimal route to a destination. A computer identifies the present position of a navigation device. A user selects a destination forming a selected destination. The computer acquires current information comprising road, business hour, traffic congestion patterns, conveyance mode, and time buffer information relative to the present position and the selected destination to store in the memory. The time buffer information comprises an amount of time to complete a task at the selected destination. A route identification unit capable of identifying, from among a combination of the stored roads, business hours of the selected destination, traffic congestion patterns, a plurality of conveyance modes, and time buffer information, an optimal route from the present position to the selected destination. The computer stores the acquired information in the memory of the navigation device and identifies an optimal route to the selected destination.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
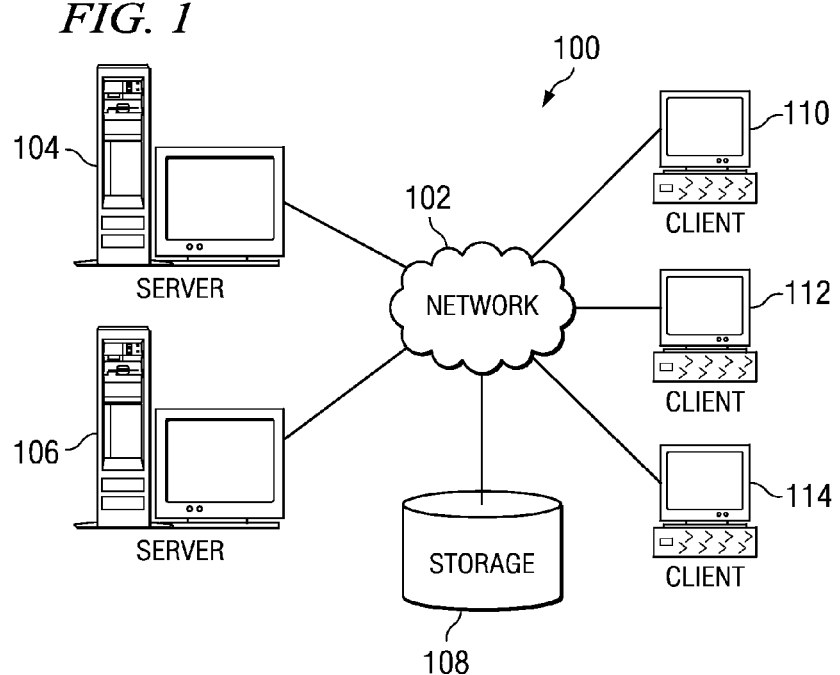
FIG. 1 is a pictorial representation of a network of computer systems in accordance with illustrative embodiments.
Figure 2:
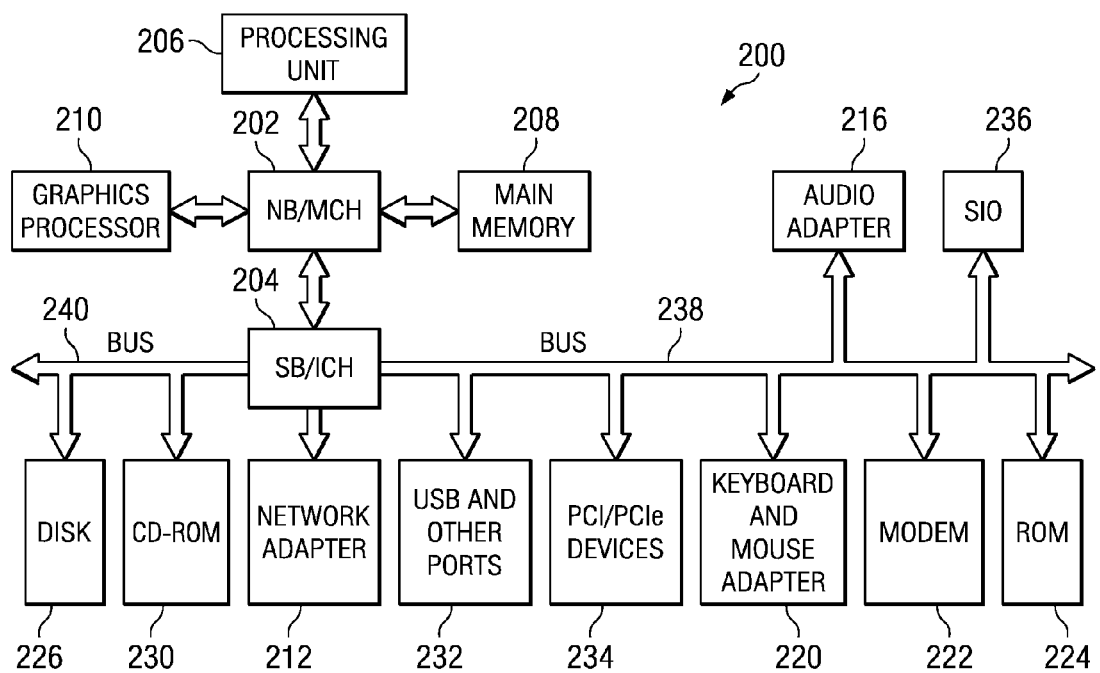
FIG. 2 is a block diagram of a computer system representative of one of the systems of FIG. 1, in accordance with illustrative embodiments.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Client type devices may include a variety of handheld devices such as mobile phones, personal digital assistants (PDA), personal computers with wired or wireless communications capabilities. These devices may be connected to data processing system 100 to exchange information in the form of pictures, sound, video, web pages, email, and voice calls. The clients may be special purpose or multi-purpose devices. For example, the client may be a mobile phone, which as a multi-purpose device, is capable of web browsing as well as well providing television, music and games in addition to the expected voice call capabilities. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including interface and memory controller hub (interface/MCH) 202 and interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to the interface/MCH through an accelerated graphics port (AGP), for example.

In the depicted example, local area network (LAN) adapter 212 is coupled to interface and I/O controller hub 204 and audio adapter 216, keyboard and mouse adapter 220, modem 222, read only memory (ROM) 224, universal serial bus (USB) and other ports 232, and PCI/PCIe devices 234 are coupled to interface and I/O controller hub 204 through bus 238, and hard disk drive (HDD) 226 and CD-ROM 230 are coupled to interface and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206 and coordinates and provides control of various components within data processing system 200 in FIG. 2. The operating system may be a commercially available operating system such as Microsoft® Windows Vista™ (Microsoft and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in interface and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or other form of personal computers with wired or wireless communications capabilities. Data processing system 200 may include a variety of handheld devices such as mobile phones, and personal digital assistants (PDA). These devices may be connected to data processing system 100 in FIG. 1 to exchange information in the form of pictures, sound, video, web pages, email, and voice calls. The clients may be special purpose or multi-purpose devices. For example, the client may be a mobile phone, which, as a multi-purpose device, is capable of web browsing as well as well providing television, music and games in addition to the expected voice call capabilities.

Figure 3:
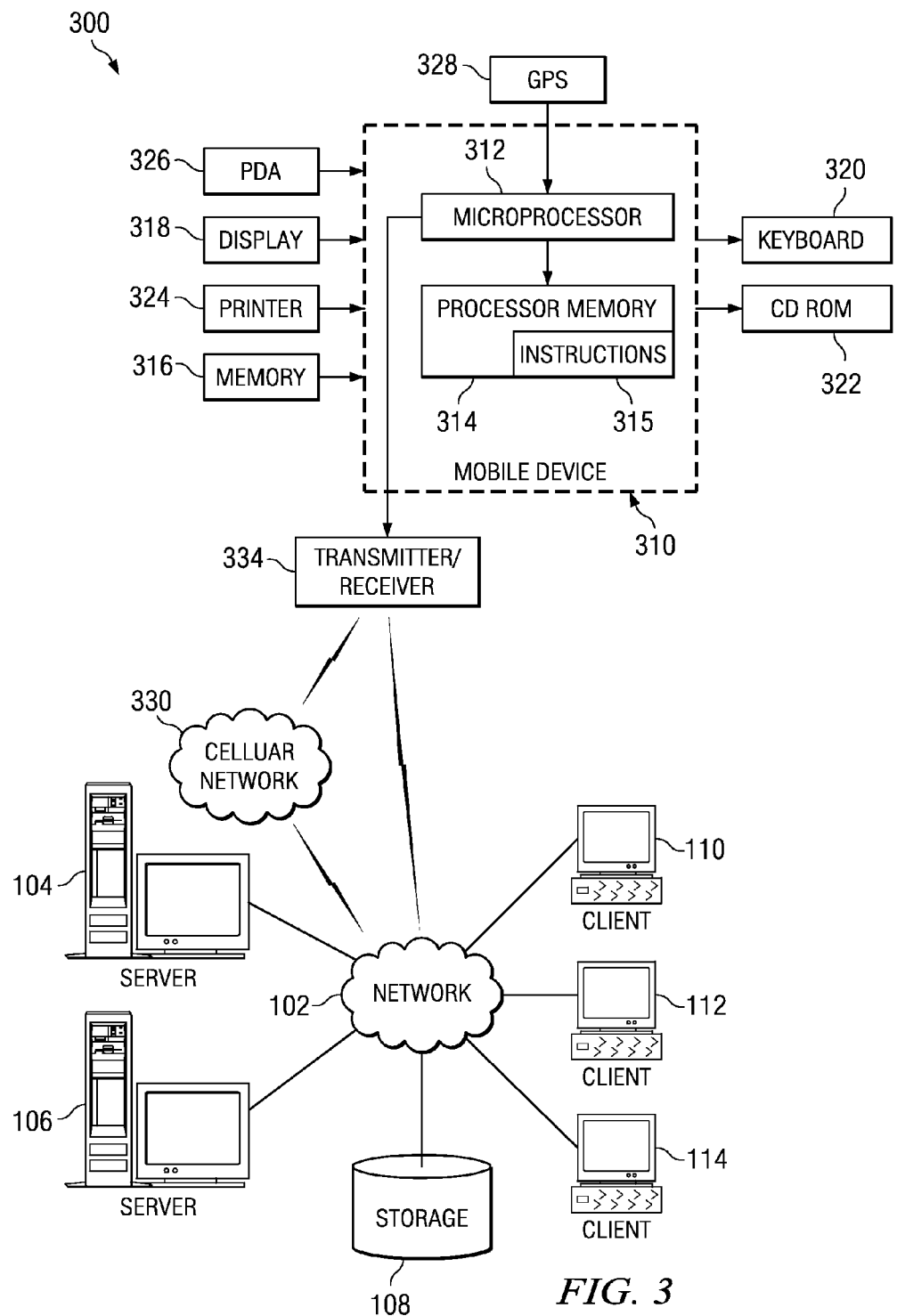
FIG. 3 is a block diagram of a computer system in cooperation with the network of computer systems of FIG. 1 in accordance with illustrative embodiments.

With reference now to FIG. 3, a block diagram of a data processing system is shown in which illustrative embodiments may be implemented. Data processing system 300 is an example of a computer, such as server 104 or client 110 in FIG. 1, in which computer usable program code or instructions implementing the processes may be located for illustrative embodiments.

In the depicted example, data processing system 300 may be a mobile device 310 comprising microprocessor 312 connected to a processor memory 314. Mobile device 310 may be typically configured for installation in a vehicle or otherwise for standalone use by connection to one or more input output devices of memory 316, display 318, keyboard 320, CD-ROM 322, printer 324, personal digital assistant (PDA) 326, and global positioning system (GPS) 328. Input may also be by voice command through a microphone (not shown) as is known in the art. Mobile device 310 may prompt or notify the user of display 318 by offering visual cues or by voice through a speaker (not shown) as is known in the art. For example, a combination of display 318 and keyboard 320 forms a selection unit capable of receiving user input would allow the user to select a destination. GPS 328 may be an example of a location unit used for determining a present position of mobile device 310. The display and keyboard may also be used to indicate the current position by allowing a user to input map coordinates as an alternative. Mobile device 310 when configured in illustrative embodiments is therefore a navigation device.

Additionally mobile device 310 is connected by transceiver 334 to both network 102 (of FIG. 1) and cellular network 330 as an information acquisition means. Transceiver 334 is a receiver capable of receiving, from various sources, current information relative to the present position and the selected destination. Through network 102, mobile device 310 has connectivity to information sources comprising clients 110-114 and servers 104-106 and database storage 108 of FIG. 1. The packaging format of mobile device 310 is of no consequence to illustrative embodiments as mobile device 310 only need be accessible to a user. Alternative forms of mobile device 310 may comprise various forms of hand held devices or other formats suitably accessible to a traveling user.

Microprocessor 312 in combination with other elements of mobile device 310 provides a route identification unit capable of performing data processing services such as those involving comparisons and route calculations to determine an optimal route. Instructions 315 resident in processor memory 314 or made resident when needed, from memory 316, control the processing of activities of mobile device 310, in the performance of route determination services comprising data acquisition, comparison, calculation and notification. A route determiner may then be viewed as set of instructions within instructions 315 relying upon comparator, identifier, elapsed time estimator and other services within the block of instructions 315 to determine an optimal route. The elapsed time estimator calculates time to travel a suggested route. The identifier includes a selection unit such as prompting via the visual display or voice.

A notification unit typically incorporates functions of one or more of display 318, and printer 324, but may also include sound and vibration movement, to provide notice to the user regarding the optimal route. Use of display 318 would not preclude use of a flashing light to also make the user aware the route had been identified. The user may then activate the display to see the optimal route, as a method of reducing power of the device.

As shown in FIG. 3, mobile device 310 has access to information through various means comprising user input or input received through transmission medium of network 102 or cellular network 330 as well as GPS 328.

Figure 4:
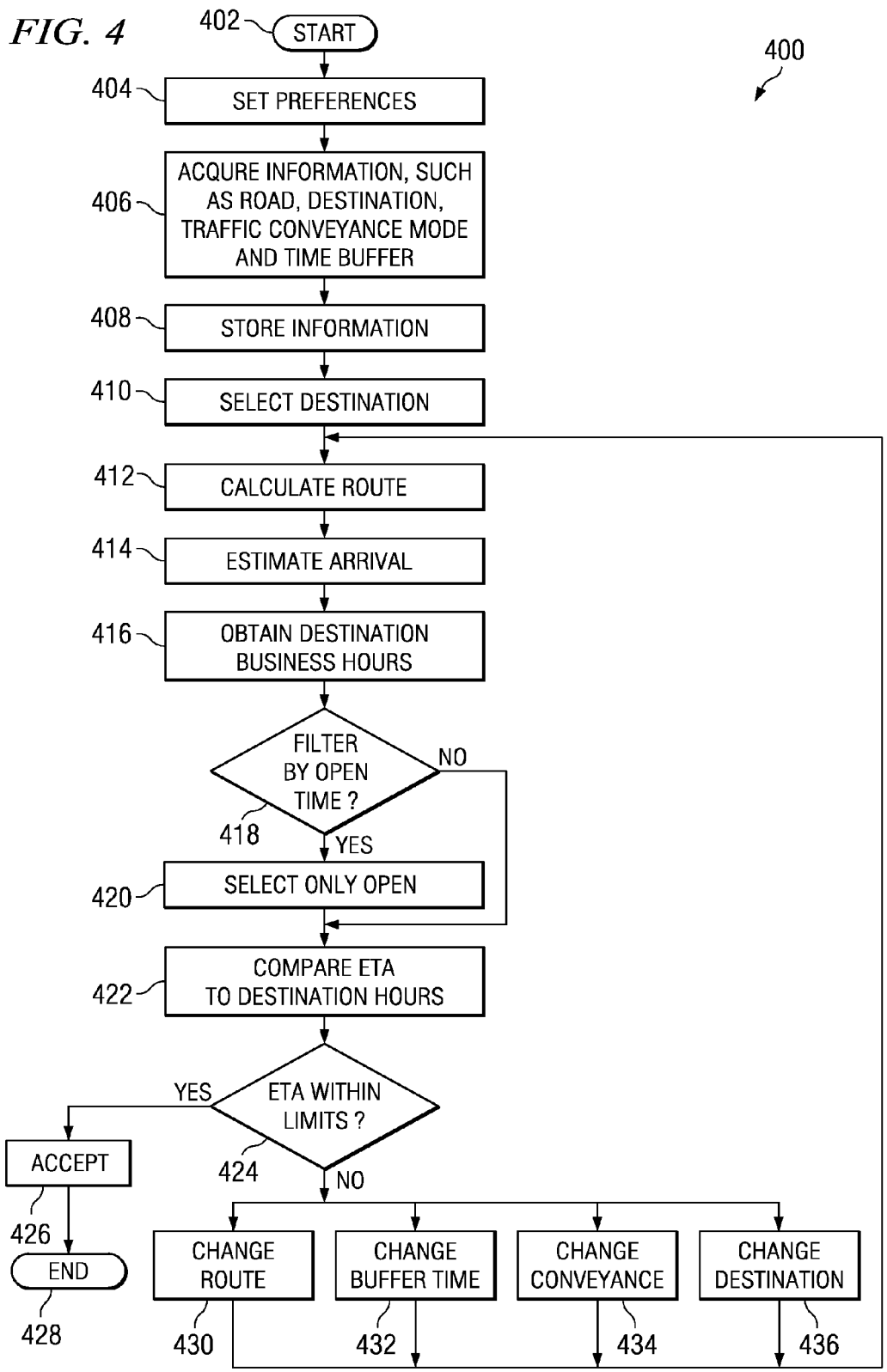
FIG. 4 is a flow chart of a process for identifying an optimal route to a destination in accordance with illustrative embodiments.

Referencing FIG. 4, a flowchart of a process for identifying an optimal route to a destination is depicted in accordance with illustrative embodiments. Process 400 may be implemented as instructions 315 of FIG. 3, in accordance with an illustrated embodiment.

Process 400 begins (step 402) with the receiving of user input for setting preferences (step 404). The user may have been prompted through a series of interactions to supply the preferences or may have been requested to perform an initial setup to provide preference information. In step 404, a user may provide various preferences comprising date and time formats, time zone information, time buffer amount and conveyance mode. Process 400 then acquires information with regard to current position, road condition and availability, weather, destination, traffic congestion, conveyance modes and time buffer (step 406). This information may be acquired from a variety of known sources comprising clients 110-114 or servers 104-106 through network 102, cellular network 330, GPS 328 and other inputs including CD-ROM 322 or keyboard 320, as shown in FIGS. 1 and 3, either through a free or fee basis and is used to reflect the real situation facing the traveler.

Process 400 then stores the acquired information for later use in route determination (step 408). The information may be updated periodically or on request to remain relatively current.

Process 400 then prompts the user to select a destination (step 410). The selected destination may be a single place or one of a collection presented, for example, a retail business having a number of locations, and calculates a route using a combination of the destination, the starting position, the provided preferences and the acquired information (step 412). An estimated arrival time at the selected destination is also calculated (step 414) for the destination selected in step 410.

Process 400 then obtains business hour information for the selected destination (step 416). Process 400 prompts the user to consider filtering by the open hours of the destination (step 418). If the data is not to be filtered by the selected destination open hours ("no" to step 418), process 400 skips to step 422.

However, if the data is to be filtered by destination open hours ("yes" to step 418), then filtering is performed with process 400 prompting the user to select an open business destination (step 420). The selected destination business hours are then compared to the estimated time of arrival at the destination (step 422). Based on the comparison, a determination is made to establish if the estimated time of arrival is within the limits of the destination open business hours (step 424).

If the arrival time is within the limits of the destination open business hours ("yes" at step 424), the user may accept the calculated route (step 426), with the process terminating thereafter (step 428). Step 426 includes notification to the user allowing the user to confirm or acknowledge the route provided. The notification unit typically includes one or more of an audio indicator, such as may be provided by a speaker, whether the output be a sound or voice, a visual indicator using text, pictures, maps or other indicia to indicate the route or a motion indicator, such as simple vibration to indicate a route has been determined and the user may then use another device, such as a printer, to examine printed output of the route.

Returning now to step 424, if the arrival time is not within the limits of the destination open business hours ("no" at step 424), process 400 moves to iterate though steps 430 to 436 to prompt the user to select choices causing the recalculation of the route. Process 400 prompts the user to select a request for a new route (step 430) or a change in the time buffer increasing or decreasing the buffer time period (step 432). The time buffer is the time the user has decided is required to make a side trip, to remain at an intermediate destination or to allow for extra time at the destination to complete a task.

Additionally, the user has the option to change the current mode of conveyance to meet the required time of the destination (step 434). A conveyance mode is a mode or manner in which a user may travel from the present position to the selected destination. A conveyance mode may be a single mode for the entire route or may be a combination of modes wherein a mode is selected for a particular portion of the route travel. A conveyance mode may therefore typically be specified broadly as being selected to comprise one or more of walking, a public vehicle and a private vehicle. Vehicle is not limited to automobile but includes all means of moving a person other than by walking.

If a conveyance mode applies to a portion of the route, the portion would be highlighted, may be specified by coordinates, or may otherwise be indicated. For example, if the traffic is congested and surface travel may not provide the desired result, the user may select a conveyance mode of "subway" if available to meet the target time at the destination. Changes made to the conveyance mode also take into account associated timing and delay variations. For example, if walking was chosen in place of a bus conveyance, due to traffic situations, the timing of the walk would be considered in the calculation of the arrival time. In a similar manner if the bus had been selected in place of an initial walking conveyance, but there were traffic congestion issues relative to the bus, a delay factor would be added into the calculations.

Additionally, in response to the prompt from process 400, the user may alter the destination to a different location or a different instance of the multiple retail locations mentioned earlier (step 436). For example, the destination may be changed from the closest restaurant location to one that has hours of business better meeting the needs of the user. A change in any one of the just mentioned parameters alters the route criteria causing process 400 to return to step 412 to recalculate the route. If no changes occur during steps 430 to 436, the route may also be recalculated without change, due to updates in the stored information.

Illustrative embodiments provide the capability to selectively change the conveyance mode in response to changing conditions or to meet predetermined criteria of the selected destination. Adding a capability to select a conveyance mode from a choice of conveyance modes provides another parameter, available to a user, with which to better determine an optimal route to a selected destination for a user. For example, conveyance mode selection no longer constrains the user to a single mode, typically that of an automobile on a street.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable storage device can be any tangible apparatus that can contain, store, communicate, or transport the program for use by or in connection with the instruction execution system, apparatus, or device.

The storage device can be an electronic, magnetic, optical, electromagnetic, infrared, or semiconductor system (or apparatus or device). Examples of a computer-readable recordable type storage device include a semiconductor or solid state memory, magnetic tape, a removable computer diskette, a random access memory (RAM), a read-only memory (ROM), a rigid magnetic disk and an optical disk. Current examples of optical disks include compact disk - read only memory (CD-ROM), compact disk - read/write (CD-R/W) and DVD. The terms "computer readable storage device" and "computer readable storage medium" do not include signal propagation media such as a copper cable, optical fiber, or wireless transmission media.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for determining an optimal route to a destination for a user, the method comprising:
   identifying, by a computer, a present position of the computer;
   selecting, by the computer, the destination to form a selected destination;
   receiving user input from the user selecting preferences of the user wherein the preferences include two or more of a date format preference, a time format preference, a time zone preference, a time buffer amount preference, and a conveyance mode preference;
   acquiring, by the computer, current information comprising road, business hours of the selected destination, traffic congestion patterns, a plurality of conveyance modes, and time buffer information relative to the present position and the selected destination, wherein the time buffer information comprises an amount of time to complete a task at the selected destination;
   storing, by the computer, the acquired current information;
   the computer identifying, from among a combination of the stored roads, business hours of the selected destination, traffic congestion patterns, the plurality of conveyance modes, and time buffer information, an optimal route from the present position to the selected destination, wherein the plurality of conveyance modes comprises walking, public vehicle, and private vehicle; and
   the computer notifying the user of the optimal route.

2. The method of claim 1, wherein the computer identifying, from among the combination of the stored roads, business hours of the selected destination, traffic congestion patterns, the plurality of conveyance modes, and time buffer information, the optimal route from the present position to the selected destination further comprises:
   determining, by the computer, when arrival time is not within predefined limits of business hours of the selected destination and when not the computer prompting the user to select one of a different route, a different destination, a different time buffer, and a different conveyance mode; and
   re-calculating, by the computer, the optimal route in response to the user selection.

3. The method of claim 1, wherein identifying, by the computer, the present position of the computer further comprises use of a global positioning satellite receiver.

4. The method of claim 1 wherein the computer notifying the user of the optimal route further comprises using one or more of an audio indicator, a visual indicator, and a motion indicator, and wherein the computer notifying the user of the optimal route using the one or more of the audio indicator, the visual indicator, and the motion indicator comprises:
   the user activating a display of the computer responsive to receiving the one or more of the audio indicator, the visual indicator, and the motion indicator; and
   presenting, by the computer, the optimal route on the display of the computer.

5. The method of claim 1, wherein the acquired current information further comprises a change in one or more of the stored roads, business hours, traffic congestion patterns, conveyance mode, and time buffer information, and the destination.

6. The method of claim 1, wherein the computer identifying the optimal route from the present position to the selected destination further comprises:
   receiving, by the computer, a user selection of a different conveyance mode for one or more portions of the optimal route; and
   re-calculating, by the computer, the optimal route using the user selection of the different conveyance mode for the one or more portions of the optimal route.

7. The method of claim 1, wherein the computer identifying the optimal route from the present position to the selected destination further comprises using the preferences of the user.

8. The method of claim 7, wherein acquiring, by the computer, the current information is responsive to receiving the user input from the user selecting the preferences of the user.

9. The method of claim 1, wherein the destination is selected by the user from one of a single location and a retail business having a number of locations.

10. A non-transitory computer program product for determining an optimal route to a destination for a user of a navigation device, the computer program product comprising:
   a computer readable storage device;
   program code, stored on the computer readable storage device, for identifying a present position of a navigation device;
   program code, stored on the computer readable storage device, for selecting the destination to form a selected destination;
   program code, stored on the computer readable storage device, for selecting the destination to receive user input from the user selecting preferences of the user wherein the preferences include two or more of a date format preference, a time format preference, a time zone preference, a time buffer amount preference, and a conveyance mode preference;
   program code, stored on the computer readable storage device, for acquiring current information comprising road, business hours of the selected destination, traffic congestion patterns, a plurality of conveyance modes, and time buffer information relative to the present position and the selected destination, wherein the time buffer information comprises an amount of time to complete a task at the selected destination;
   program code, stored on the computer readable storage device, for storing the acquired current information in a memory of the navigation device;
   program code, stored on the computer readable storage device, for identifying, from among a combination of the stored roads, business hours of the selected destination, traffic congestion patterns, the plurality of conveyance modes, and time buffer information, an optimal route from the present position to the selected destination, wherein the plurality of conveyance modes comprises walking, public vehicle, and private vehicle; and
   program code, stored on the computer readable storage device, for notifying the user of the optimal route.

11. The non-transitory computer program product of claim 10, wherein the program code for identifying the optimal route further comprises:
   program code, stored on the computer readable storage device, determining when arrival time is not within pre-defined limits of business hours of the selected destination and when not, prompt the user to select one of a different route, a different destination, a different time buffer, and a different conveyance mode; and
   program code, stored on the computer readable storage device, for re-calculating the optimal route in response to the user selection.

12. The non-transitory computer program product of claim 10, wherein the program code for notifying further comprises:
   program code, stored on the computer readable storage device, using one or more of an audio indicator, a visual indicator, and a motion indicator, and wherein the program code for notifying the user of the optimal route using the one or more of the audio indicator, the visual indicator, and the motion indicator comprises:
   program code for the user activating a display of the navigation device responsive to receiving the one or more of the audio indicator, the visual indicator, and the motion indicator; and
   program code for presenting the optimal route on the display of the navigation device.

13. The computer program product of claim 10, wherein the acquired current information further comprises road construction indication including detours, business holidays, traffic congestion patterns, and conveyance mode availability and delay information.

14. The non-transitory computer program product of claim 10, wherein the program code for identifying the optimal route from the present position to the selected destination further comprises:
   program code, stored on the computer readable storage device, for receiving a user selection of a different conveyance mode for one or more portions of the optimal route; and
   program code, stored on the computer readable storage device, for re-calculating the optimal route using the user selection of the different conveyance mode for the one or more portions of the optimal route.

* * * * *